Sept. 17, 1929. A. J. McCLELLAN 1,728,211
COOKING UTENSIL
Filed July 23, 1927
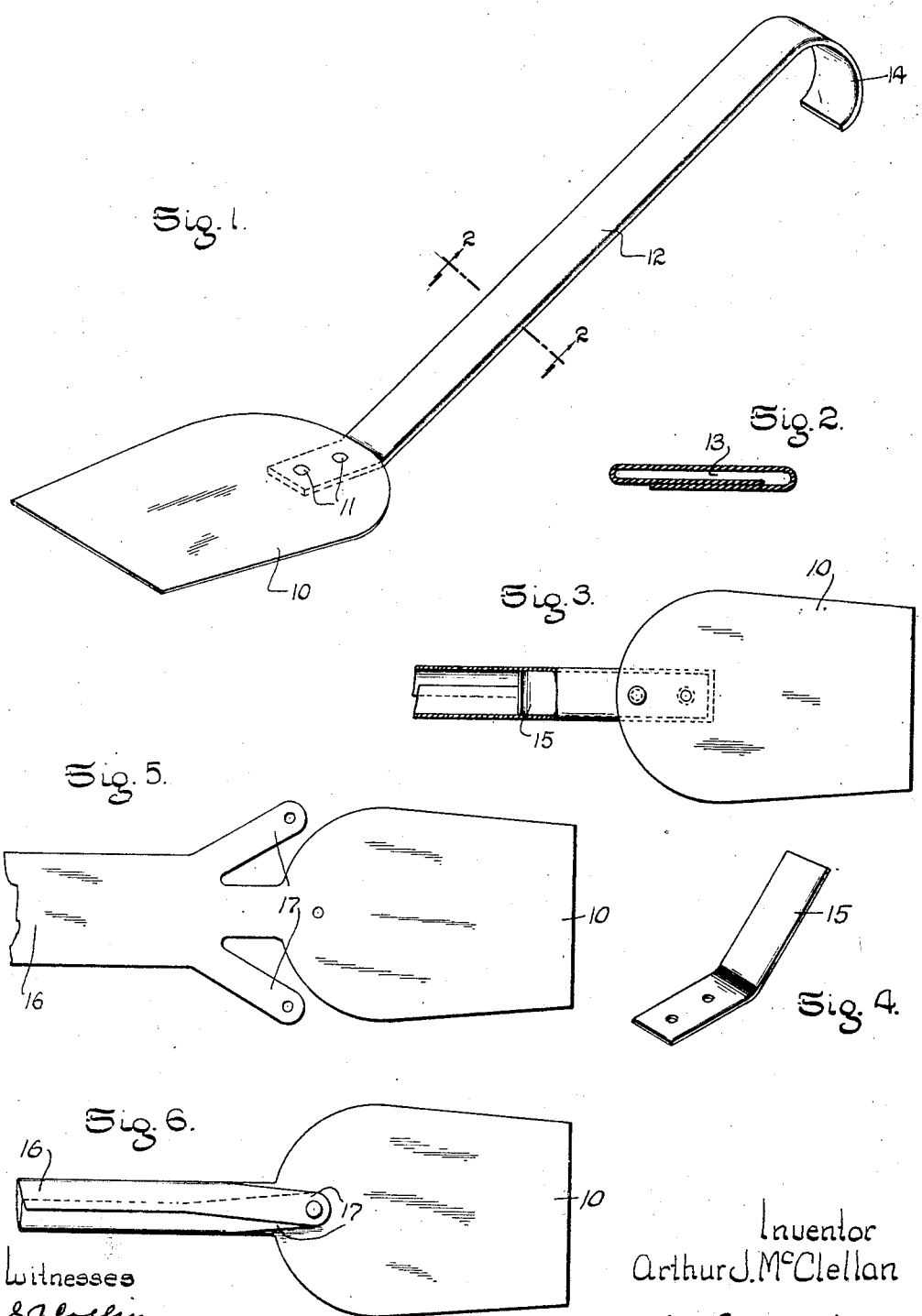
Witnesses
S. J. Collins
F. C. Appleton
Inventor
Arthur J. McClellan
By Joshua R. H. Potk
his Attorney Patented Sept. 17, 1929

1,728,211

UNITED STATES PATENT OFFICE

ARTHUR J. McCLELLAN, OF CHICAGO, ILLINOIS

COOKING UTENSIL

Application filed July 23, 1927. Serial No. 207,883.

This invention relates to improvements in cooking utensils, and more particularly to an improved food turner.

The object of my invention is to provide an improved food turner that will be convenient to handle, low in price, and adapted for quantity production.

A further object of my invention is to provide an improved food turner having means whereby the handle is protected against breakage at its weakest point, and having means adapted to keep the handle cool. With these and other objects and advantages of construction, the invention will be more fully described in the hereinafter specification, when taken in connection with the accompanying drawings, in which, Figure 1 is a perspective view of my invention.

Figure 2 is a section taken on line 2—2 of Figure 1.

Figure 3 is a front elevation, with parts broken away, of a modified form of my invention.

Figure 4 is a perspective view of a reinforcing element.

Figure 5 is a plan view of a modified form of my invention.

Figure 6 is an inverted plan view of the modified form shown in Figure 5.

In the drawing, 10 is a food turner blade attached to a handle 12 by means of rivets 11. The handle 12 is formed of a piece of stamped metal, folded upon itself to afford a convenient grip having the cooling air chamber 13, and the bend 14 for hanging same wherever convenient. Under circumstances where the food turner is subjected to particularly hard usage, as in restaurants, hotels and similar public eating places, the angle 15 is preferably inserted in the hollow handle at the point where it joins the blade,— a single stroke of a riveting machine or other conventional method during the process of manufacture is then sufficient to fasten the blade, handle and angle 15 securely together.

In the modification shown in Figures 5 and 6, the food turner is formed of a single piece of die stamped metal 16, having the tabs 17, which latter are bent under and then pressed into engagement with the underneath part of the blade, thereby serving to reinforce the blade and handle at their junction,—the point where bending or breakage most commonly occurs. The tabs, for the purpose of clearer illustration, have been shown of comparatively slender construction. I have, however, in practice, found it desirable to form the tab of greater width to meet the need for a utensil of this description adapted for more rugged service than that required for purely domestic or household purposes.

In view of the competition now existing in the manufacture of cooking utensils, I have found that there is a strong commercial demand for a food turner having the advantages pointed out above, and which, in addition, can be produced on a quantity basis by the process of die stamping, to be sold at a low price.

It will be evident that changes and modifications in the method and in the form herein illustrated may be made without departing from the spirit of or sacrificing any of the advantages of the invention described; hence I do not confine myself to the precise details of construction as set forth, but desire to emphasize the fact that various minor changes in the proportion and arrangement may be resorted to when required.

What I claim as new and desire to secure by Letters Patent is:

1. As an article of manufacture, a food turner comprising two sheet metal members, one of said sheet metal members being folded upon itself to form a hollow handle the other of said members being formed to provide a plate, said handle being riveted to said blade having a reinforcing member connected to said handle whereby both blade and handle are strengthened.

2. As an article of manufacture, a food turner comprising a blade, a handle, an insertible strengthening element for said handle and blade, said handle, blade and strengthening means being simultaneously joined together at a single operation into a completed article.

3. A food turner comprising a blade, a hollow handle riveted to said blade, and means within said handle consisting of an angular strip registering with a lower bent portion thereof, whereby said blade and handle are reinforced at the junction point when joined together by riveting.

In testimony whereof I have signed my name to this specification.

ARTHUR J. McCLELLAN.